United States Patent
Gantman et al.

(10) Patent No.: US 9,198,215 B2
(45) Date of Patent: Nov. 24, 2015

(54) PEER CONNECTIVITY USING RECIPROCAL WIRELESS CONNECTIONS

(71) Applicant: QUALCOMM Incorporated, San Diego, CA (US)

(72) Inventors: Alexander Gantman, Yokneam (IL); Dedy Lansky, Zichron Yaacov (IL); Yossef Tsfaty, Rishon-Le-Zion (IL)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 13/938,792

(22) Filed: Jul. 10, 2013

(65) Prior Publication Data
US 2014/0247711 A1  Sep. 4, 2014

Related U.S. Application Data

(60) Provisional application No. 61/771,762, filed on Mar. 1, 2013, provisional application No. 61/772,457, filed on Mar. 4, 2013.

(51) Int. Cl.
*H04B 7/00* (2006.01)
*H04W 76/02* (2009.01)
*H04W 48/20* (2009.01)

(52) U.S. Cl.
CPC ............ *H04W 76/025* (2013.01); *H04W 48/20* (2013.01)

(58) Field of Classification Search
None
See application file for complete search history.

(56) References Cited

U.S. PATENT DOCUMENTS

| | | | |
|---|---|---|---|
| 8,054,743 B2 | 11/2011 | Matsuoka et al. | |
| 8,964,533 B2 * | 2/2015 | Moore et al. | 370/221 |
| 2005/0188105 A1 * | 8/2005 | Reinhard et al. | 709/238 |
| 2012/0108185 A1 * | 5/2012 | Yen et al. | 455/90.2 |
| 2012/0278192 A1 | 11/2012 | Shirron et al. | |
| 2012/0320886 A1 * | 12/2012 | Anders et al. | 370/338 |
| 2013/0036231 A1 | 2/2013 | Suumaeki | |
| 2013/0223220 A1 * | 8/2013 | Nagarajan et al. | 370/235 |
| 2014/0177540 A1 * | 6/2014 | Novak et al. | 370/329 |

FOREIGN PATENT DOCUMENTS

| | | |
|---|---|---|
| EP | 2506653 | 10/2012 |
| WO | 2012106018 | 8/2012 |
| WO | 2014134414 | 9/2014 |

OTHER PUBLICATIONS

"Orange Labs: "Collaboration Between 2.4/5 and 60 GHz, 11-10-0492-00-00ad-collaboration-between-2-4-5- and-60-ghz"", Apr. 30, 2010, IEEE Draft, 11-10-0492-00-00AD-Collaboration-Between-2-4-5- and-60-GHz, IEEE-SA Mentor, Piscataway, NJ, USA, pp. 1-19, XP017677066 [retrieved on Apr. 30, 2010]., 19 pages.

"PCT Application No. PCT/US2014/019333 International Search Report and Written Opinion", 11 pages.

Super User (Feb. 2013) Soft AP in Windows. Retrieved from http://softgetaway.netai.net/2-uncategorised/7-soft-ap-in-windows.

* cited by examiner

*Primary Examiner* — Kwang B Yao
*Assistant Examiner* — Juvena Loo
(74) *Attorney, Agent, or Firm* — DeLizio Law, PLLC

(57) ABSTRACT

Reciprocal wireless connections may be established between a pair of devices to support failover, load balancing, traffic distribution, or other peer-to-peer connectivity features. Each device of a pair of devices may implement both a local wireless access point and a local wireless station to communicate with the other device of the pair of devices. Establishment of a second wireless connection between the pair of devices may be coordinated using a protocol extension of a first wireless connection. A multiplexing (MUX) component may coordinate traffic among the reciprocal wireless connections.

33 Claims, 9 Drawing Sheets

PEER CONNECTIVITY USING RECIPROCAL WIRELESS CONNECTIONS

CROSS-REFERENCE TO RELATED APPLICATIONS

This application claims priority to U.S. Provisional Application Ser. No. 61/771,762, entitled "PEER CONNECTIVITY USING RECIPROCAL WIRELESS CONNECTIONS" filed on Mar. 1, 2013, and to U.S. Provisional Application Ser. No. 61/772,457, entitled "PEER CONNECTIVITY USING RECIPROCAL WIRELESS CONNECTIONS" filed on Mar. 4, 2013, both of which are incorporated herein by reference.

BACKGROUND

Embodiments of the inventive subject matter generally relate to the field of wireless communications, and, more particularly, to reciprocal wireless connectivity between peer devices.

There are currently several different wireless protocols which enable wireless communications between devices. Each protocol may provide different features that impact range of coverage, speed, reliability, etc. As non-limiting examples, IEEE defines several protocols traditionally used for consumer devices. For example, the IEEE 802.11n wireless network protocol provides a good range, and has a throughput of about 54 Mbit/s to 150 Mbit/s. The IEEE 802.11 ac wireless network protocol enables multi-station wireless area networks to have throughput of about 1 Gbit/s, and provides a maximum single link throughput of about 500 Mbit/s. The IEEE 802.11 ad wireless network protocol (sometimes also referred to as "11 ad" or WiGig™), has a maximum throughput of about 7 Gbit/s, and may have a limited range. Other wireless network protocols are existent and may have different characteristics.

Some wireless network protocols are suitable for short range high speed communications (e.g., within a room). For example, the recently approved IEEE 802.11ad wireless network protocol provides for use of unlicensed 60 GHz radio spectrum band (typically 57-66 GHz) which is suitable for short range high speed communication. However, a device may travels beyond the coverage range of an IEEE 802.11ad access point. Mobility may be supported by the use of a different wireless network protocol. For example, the range associated with 2.4 GHz or 5 GHz is typically greater than the range associated with 60 GHz. IEEE 802.11ad introduces a "Fast Session Transfer" (FST) capability which enables switching from the 60 GHz spectrum used by 802.11ad communications to the 2.4 GHz or 5 GHz spectrum band used by the other communications protocols (e.g., 802.11a/b/g, 802.11n, 802.ac, or other protocols).

SUMMARY

Various embodiments are disclosed in which reciprocal wireless communications connections may be established between a pair of devices. Coordination of wireless access point services at each device may be used to establish the reciprocal wireless communications connections in accordance with this disclosure. Various embodiments of a multiplexing (MUX) component are introduced to support establishment, coordination, and seamless handover using the reciprocal wireless communications between peer devices. In some implementations, the reciprocal wireless communications connections may be used for failover capability of a first communications connection.

In one embodiment a first device includes at least a first local wireless interface and a second local wireless interface. The first device establishes a first wireless connection between the first local wireless interface of the first device and a first remote wireless interface of a second device. The first device determines that the second device supports establishment of a reciprocal wireless connection via a second remote wireless interface of the second device. The first device establishes a second wireless connection between the second local wireless interface of the first device and a second remote wireless interface of the second device. The first and second wireless connections are reciprocal wireless connections such that each of the first and second devices is configured as a wireless access point for a corresponding one of the first and second wireless connections.

In one aspect the first device may implement both a local wireless access point and a local wireless station to communicate, respectively, with a remote wireless station implemented at a second device and a remote wireless access point implemented at the second device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
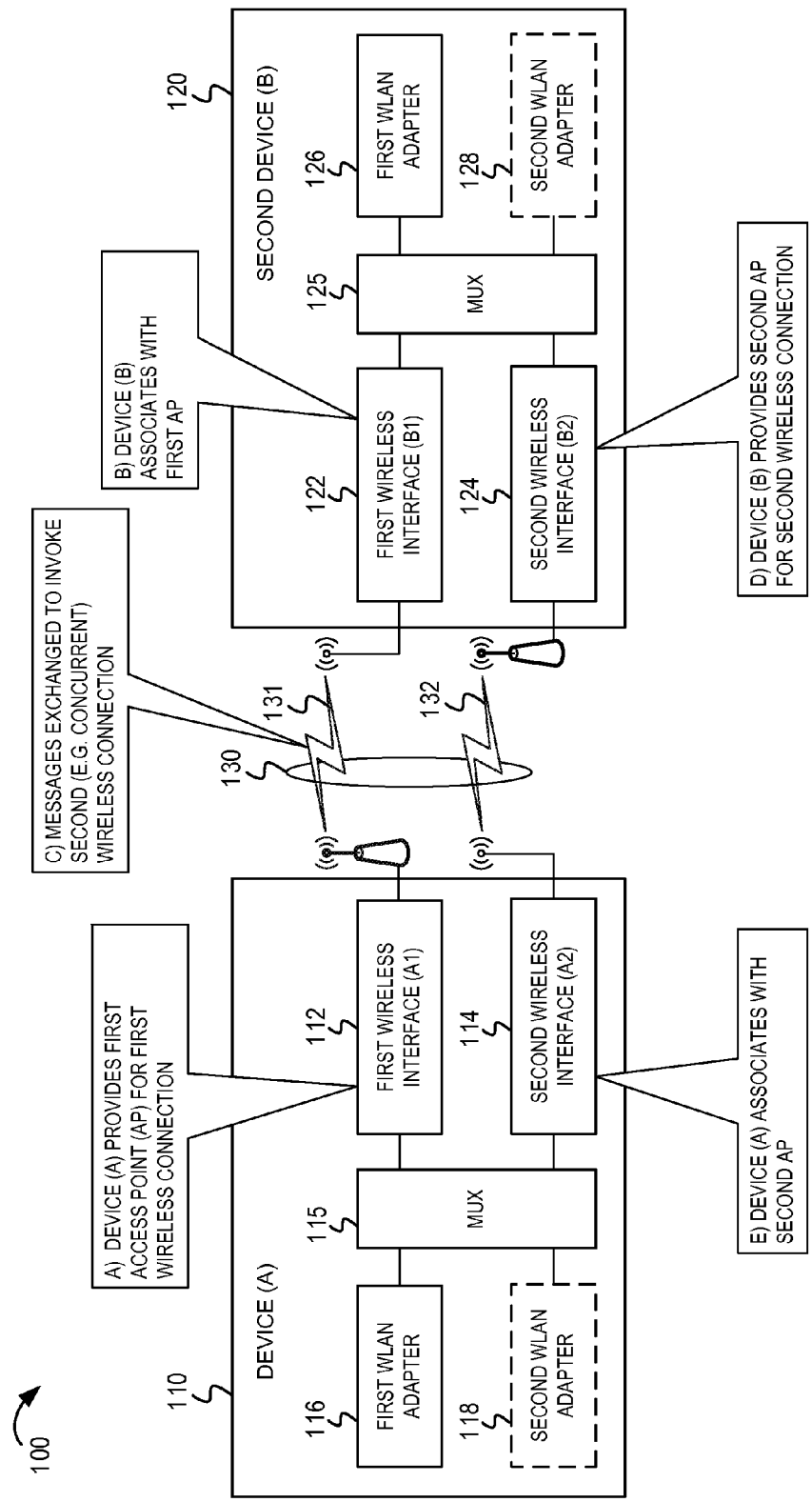
FIG. 1 is a system diagram illustrating an example embodiment of reciprocal wireless connections and example operations for establishing the reciprocal wireless connections.

The description that follows includes exemplary systems, methods, techniques, instruction sequences and computer program products that embody techniques of the present inventive subject matter. However, it is understood that the described embodiments may be practiced without these specific details. For instance, although examples may refer to specific wireless protocols, the disclosed embodiments may be practiced with a variety of different protocols. For example, while IEEE 802.11 wireless protocols are used in various examples, other wireless protocols may be used with embodiments of this disclosure. In other instances, well-known instruction instances, protocols, structures and techniques have not been shown in detail in order not to obfuscate the description. Furthermore, while examples provided herein refer to a first device (sometimes referred to as device "A") and a second device (sometimes referred to as device "B"), it should be understood that the labels "first" device and "second" device are used for descriptive purposes and not implying any order or sequence.

IEEE 802.11ad protocol is expected to provide very high speed throughput at the 60 GHz unlicensed spectrum. However, the range of 802.11ad protocol may be constrained based on power limitations, environmental factors, or other reasons. It is expected that very high speed throughput may be possible up to 10 m. One example application for 802.11ad protocol includes multimedia content streaming over short distances—such as between two devices in the same room of a building or home. Fast Session Transfer (FST) is a feature of 802.11ad protocol that allows an 802.11ad compliant device to switch to a 2.4 GHz or 5 GHz connection (for example, using another wireless protocol such as 802.11a/b/g/n/ac protocols). In one aspect of the present disclosure, two devices may maintain a first wireless connection using 802.11ad protocol and a second wireless connection using a different wireless protocol.

When two devices establish a wireless connection, typically one device behaves as a wireless access point (AP) and the other device behaves as a wireless station (STA). The AP is configured to receive connection requests from a STA and perform authentication and association procedures to establish the wireless connection with the STA. An AP in a device may be software based. For example, a laptop may configure a wireless interface as an AP using a service called "SoftAP" (also referred to as software-based AP). A computer operating system may provide a SoftAP service that can be utilized by a local wireless interface of the computer system. However, due to limitations imposed by the computer operating system, some computer systems may be limited to a single SoftAP service. Alternatively, legacy computer operating systems may already be deployed in which a single SoftAP service is available for use by wireless interface drivers.

For each wireless connection between a pair of devices, one of the devices should utilize the SoftAP service and the other device should behave as a wireless station for the wireless connection. To establish two wireless connections between the pair of devices, in some implementations the SoftAP service on each device may be utilized, each device behaving as a wireless access point for a corresponding one of the two wireless connections. The two wireless connections may be referred to as reciprocal wireless connections in this disclosure. Other non-limiting terms to refer to the peer connectivity described in this disclosure may include "symmetric dual links," "confederated wireless connections," "coordinated peer-to-peer wireless connections," or other terms. In reciprocal wireless connections, one device is configured as an access point for a first wireless connection and the other device is configured as an access point for a second wireless connection. Several non-limiting examples of reciprocal wireless connections are described throughout this disclosure.

FIG. 1 depicts a system 100 having an example embodiment of reciprocal wireless connections. FIG. 1 will also be used to introduce example operations for establishing the reciprocal wireless connections. A first device 110 (device "A") includes a first wireless interface 112 ("A1") and a second wireless interface 114 ("A2"). The first device 110 also includes a multiplexing component 115 (also referred to as a "MUX"), a first wireless local area network (WLAN) adapter 116 and a second WLAN adapter 118. In an operating system, a WLAN adapter is used to represent a physical network interface (such as first wireless interface 112) to other components of the operating system. In some embodiments, the first WLAN adapter 116 may be used to represent both the first wireless interface 112 and the second wireless interface 114 as a single WLAN adapter of the operating system. In other embodiments, each of the first wireless interface 112 and second wireless interface 114 are represented as different WLAN adapters (such as first WLAN adapter 116 and second WLAN adapter 118, respectively). The MUX 115 may implement logic to associate traffic between the first and second WLAN adapters 116, 118 and corresponding first and second wireless interfaces 112, 114. The MUX 115 may change logical associations between the WLAN adapter(s) and wireless interface(s) as needed based on service requirements, failover, or other factors.

The system 100 includes a second device 120 (device "B"). The second device 120 includes corresponding components similar to components described in relation to the first device 110. For example, the second device 120 may include a first wireless interface 122, a second wireless interface 124, a first WLAN adapter 126, a second WLAN adapter 128, and a MUX 125.

It should be noted that it is not necessary for the first device 110 and second device 120 to share the same hardware configurations, components, or device type. For example, the first device 110 may be a laptop, while the second device 120 may be a mobile device. Alternatively, first device 110 may be a multimedia server and second device 120 may be a consumer appliance. First device 110 and second device 120 may each be an electronic device configured to implement one or more communication protocols or access technologies, such as a mobile phone, a smartphone, a tablet computer, a smart appliance, a set-top box (STB), a gaming console, a desktop computer, a laptop computer, a notebook computer, or other suitable electronic devices. First device 110 and second device 120 may also be network devices, such as a network router, a home gateway, a WLAN access point, or a network switch.

As an example in FIG. 1 both of the first wireless interfaces (A1 and B1) utilize a compatible wireless network protocol, such as 802.11n protocol, implemented on both of the interfaces. Similarly, both of the second wireless interfaces (A2 and B2) may use a different compatible wireless network protocol, such as 802.11ad protocol, implemented on both of the interfaces. Typically, each interface is associated with a media access control (MAC) address which uniquely identifies a physical interface.

In FIG. 1, the first device 110 and second device 120 have concurrent reciprocal wireless connections 130 including a first wireless connection 131 and a second wireless connection 132. The first wireless connection 131 comprises the first wireless interface A1 112 of the first device 110 acting as a wireless access point (indicated using a base station antenna in the Figures). The first wireless connection 131 also comprises the first wireless interface B1 122 of the second device 120 acting as a wireless station (indicated using a generic antenna in the Figures). It should be understood that the different antennas are shown for illustrative purposes and not intended to indicate a particular type of antenna.

The second wireless connection 132 is reciprocal in the sense that the second wireless interface B2 124 (of the second device 120) acts as the wireless access point, while the second wireless interface B1 114 (of the first device 110) acts as the wireless station. Together the first and second wireless connections 130 may be referred to as reciprocal wireless connections between the first and second devices 110, 120.

Having described the system 100 and reciprocal wireless connections 130, FIG. 1 will also be used to describe an embodiment of establishing the reciprocal wireless connections 130. Further examples of establishing the reciprocal wireless connections 130 may be described in subsequent figures.

At stage A, the first device (A) 110 provides a first AP using the first wireless interface (A1) 112 to facilitate the first wireless connection 131. At stage B, the second device (B) 120 may authenticate and associate with the first AP using the first wireless interface (B1) 122. In some embodiments, the establishment of the first wireless connection 131 may utilize conventional processes for establishing a wireless connection.

At stage C, the first and second devices 110, 120 may exchange messages to invoke the second (e.g., concurrent in this example) wireless connection 132. For example, one of the devices may query the other device to determine whether the other device supports reciprocal wireless connections. Alternatively, rather than querying, one of the devices may offer a reciprocal wireless connection and determine from a response (or lack thereof) if the other device supports the reciprocal wireless connection. Further examples of determining that a remote device supports reciprocal wireless connections are described further in subsequent figures. In addition to determining the capability of a reciprocal wireless connection, the devices may exchange configurations, profiles, or other settings via the first wireless connection 131 to streamline the connection establishment process for the second wireless connection 132.

In the example of FIG. 1, the devices have determined that reciprocal wireless connections are supported and exchange security or other settings. At stage D, the second device (B) 120 configures the second wireless interface (B2) 124 to provide a second AP for the second wireless connection. For example, the second device 120 may associate a SoftAP service of the operating system of the second device 120 with the second wireless interface (B2) 124.

At stage E, the first device (A) 110 associates with the second AP using the second wireless interface (A2) 114 acting as a wireless station.

Once the reciprocal wireless connections 130 are established, the MUX 115 or MUX 125 may redirect, route, or otherwise associate traffic from a particular wireless connection with WLAN adapter(s). Furthermore, Fast Session Transfer protocols may be streamlined or improved to take advantage of an existing alternate wireless connection in the event of a failure of one of the wireless connections.

Figure 2:
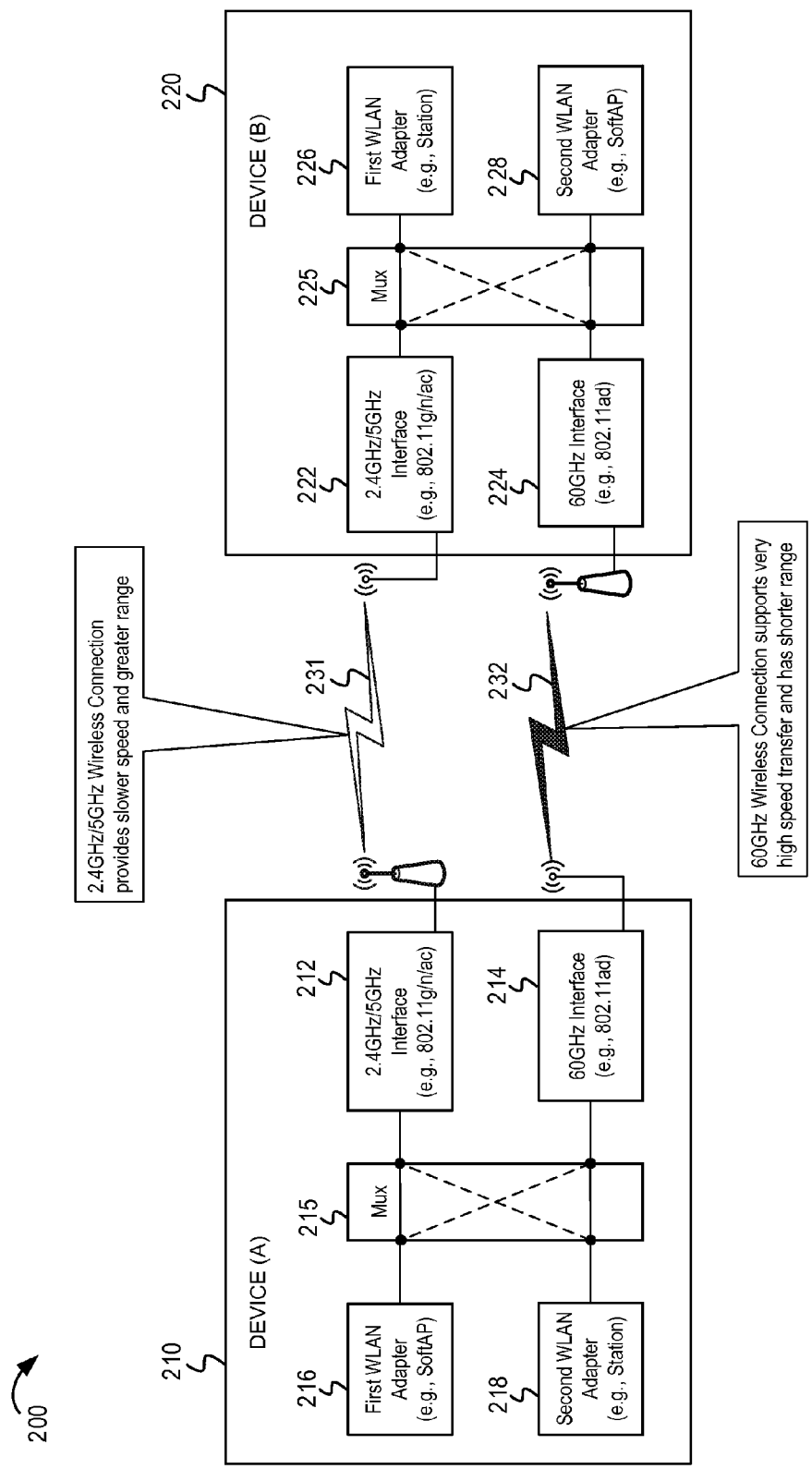
FIG. 2 is a diagram illustrating an example implementation in accordance with various embodiments of the present disclosure.

FIG. 2 is a diagram 200 illustrating an example implementation in accordance with various embodiments of the present disclosure. First device (A) 210 includes a 2.4 GHz/5 GHz interface 212, a 60 GHz interface 214, a MUX 215, first WLAN adapter 216, and second WLAN adapter 218. Second device (B) 220 includes a 2.4 GHz/5 GHz interface 222, a 60 GHz interface 224, a MUX 225, first WLAN adapter 226, and second WLAN adapter 228. A first wireless connection 231 utilizes the 2.4 GHz or 5 GHz spectrum (and an associated protocol such as 802.11a/b/g/n/ac protocol). A second wireless connection 232 utilizes the 60 GHz spectrum (and an associated protocol such as 802.11ad protocol).

In one implementation, the 2.4 GHz/5 GHz first wireless connection 231 may be established first. The spectrum for 2.4 GHz/5 GHz may provide greater distance and more reliable connectivity for use in establishing the second wireless connection 232. Once the second wireless connection 232 is established, it may be used for very high speed transfer of information between the two peer devices. However, due to the distance constraints for the 60 GHz spectrum, the first wireless connection 231 may be maintained to support failover.

The MUX 215 may be configured to associate the first WLAN adapter 216 (acting as AP using a SoftAP service) with the 2.4 GHz/5 GHz interface 212. The MUX 215 may be configured to associate the second WLAN adapter 218 (acting as wireless station) with the 60 GHz interface 214. However, the MUX 215 may be capable of dynamically changing the associations of the WLAN adapters as needed to support seamless failover for upper protocol layers. For example, an IP layer of a protocol stack may be unaware of a change by the MUX 215 to redirect traffic from the second WLAN adapter 218 to the 2.4 GHz/5 GHz interface 212. MUX 225 may also be configured to dynamically alter associations between the WLAN adapters 226, 228 and the corresponding interfaces 222, 224.

In one embodiment, both the first and second wireless connections 231, 232 are maintained to support seamless failover. Other uses for the concurrent wireless connections may be readily conceived. For example, the devices may utilize the first wireless connection 231 for signaling or control protocols while utilizing the second wireless connection 232 for multimedia streaming. In other embodiments, load sharing or load balancing may be used over the concurrent wireless connections 231, 232.

Figure 3:
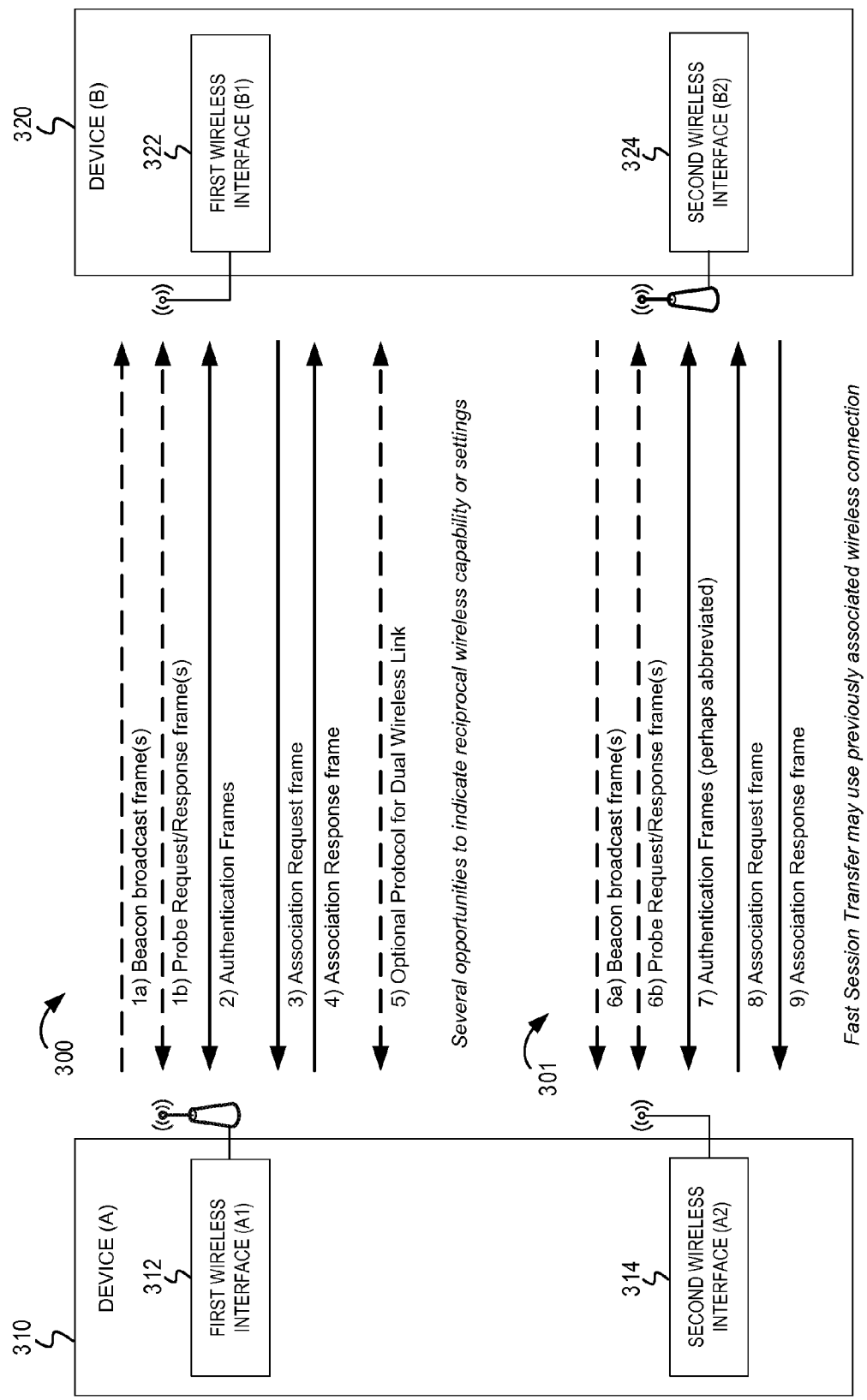
FIG. 3 is a conceptual diagram illustrating an example connection establishment messages in accordance with various embodiments of the present disclosure.

FIG. 3 is a conceptual diagram 300 illustrating an example connection establishment messages in accordance with various embodiments of the present disclosure. A first device (A) 310 may include a first wireless interface (A1) 312 and a second wireless interface (A2) 314. A second device (B) 320 may include a first wireless interface (B1) 322 and a second wireless interface (B2) 324. The first wireless interface (A1) 312 and the first wireless interface (B1) 322 establish a first wireless connection using connection establishment messages 300. The second wireless interface (A2) 314 and the second wireless interface (B2) 324 establish a second wireless connection using connection establishment messages 301. The forgoing descriptions of connection establishment messages 300, 301 are provided as a non-limiting example of one embodiment.

First connection establishment messages 300 are described as messages 1a-5. Messages 1a and 1b may be different alternatives of a scanning procedure used for the second device 320 to discover the wireless access point of the first device 310. At message 1a, the first wireless interface 312 is configured to transmit beacon broadcast frame(s). The beacon frames may include information about the wireless access point (such as an identifier) and optionally may also indicate support for reciprocal wireless connections. Alternatively, at messages 1b, the second device 320 may send a probe request and receive a probe response frame from the first device 310. Optionally, the probe request/response messages may include implementation-specific information elements (portions of the messages) to query and respond with information about reciprocal wireless connection support. At messages 2, an authentication process may be used between the first and second devices 310, 320 prior to association.

At message 3, the second device 320 may send an Association Request frame to establish the first wireless connection. At message 4, the first device 310 may respond with an Association Response frame to grant the first wireless connection. In some implementations, the association response may also indicate support for reciprocal wireless connections. Furthermore, the association response may include configuration information regarding the establishment of the second wireless connections. Examples of configuration information regarding the second wireless connection are included in FIG. 4 of this disclosure.

In one embodiment, further messages may be exchanged to enhance the peer connectivity. For example, at messages 5, an optional protocol (or extension to an existing protocol) may be used. In some embodiments, the further messages may be formatted in accordance with a predetermined MAC message format, such as the one described in FIG. 4. Alternatively, the further messages may be formatted in accordance with an implementation-specific messaging protocol that is implemented at both devices.

Throughout the messages in the first connection establishment 300, there are several opportunities which could be used for one or both of the devices to indicate reciprocal wireless capabilities or settings. In some embodiments, settings may be exchanged to streamline the establishment of the second wireless connection. For example, some scanning procedures and authentication procedures for the second connection establishment may be omitted or reduced as a result of coordination over the first wireless connection. Further description of configurations and settings are described in relation to FIG. 4.

Still on FIG. 3, the establishment of the second wireless connection is described in relation to messages 301. Similar to messages 1a, 1b, a scanning procedure may be utilized for discovery of the second wireless access point to be used for the second wireless connection. Messages 6a and 6b may be different alternatives of a scanning procedure used for the first device 310 to discover the wireless access point (associated with second wireless interface 324) of the second device 320. At message 6a, the second wireless interface 324 may be configured to transmit beacon broadcast frame(s). Alternatively, at messages 6b, the first device 310 and second device 320 may exchange a probe request frame and a probe response frame, respectively.

At message 7, authentication frames may be exchanged prior to association of the second wireless connection. In one embodiment the authentication process may be abbreviated or omitted due to the security pre-configuration or reuse of security credentials via the first wireless connection.

At message 8, the first device 310 may send an Association Request frame to establish the second wireless connection. At message 9, the second device 320 may respond with an Association Response frame to grant the second wireless connection.

In some embodiments, the association procedure for the second wireless connection may be enhanced based upon pre-configuration via the first wireless connection. In some implementations, the MAC address of the second wireless interface 314 may be provided via the first wireless connection prior to the association procedure. For example, the MAC address of the second wireless interface 314 may be provided by the first device 310 in the message 4 Association Response frame or in one of the further messages 5. If provided by the first device 310 prior to the first device 310 sending the association request (message 8), then the second device 320 may determine if the association request (message 8) is received from the second wireless interface 314 of the first device 310. If the association attempt comes from a station that is not associated with the second wireless interface 314, then the second wireless interface 324 of the second device may reject the association attempt.

Figure 4:
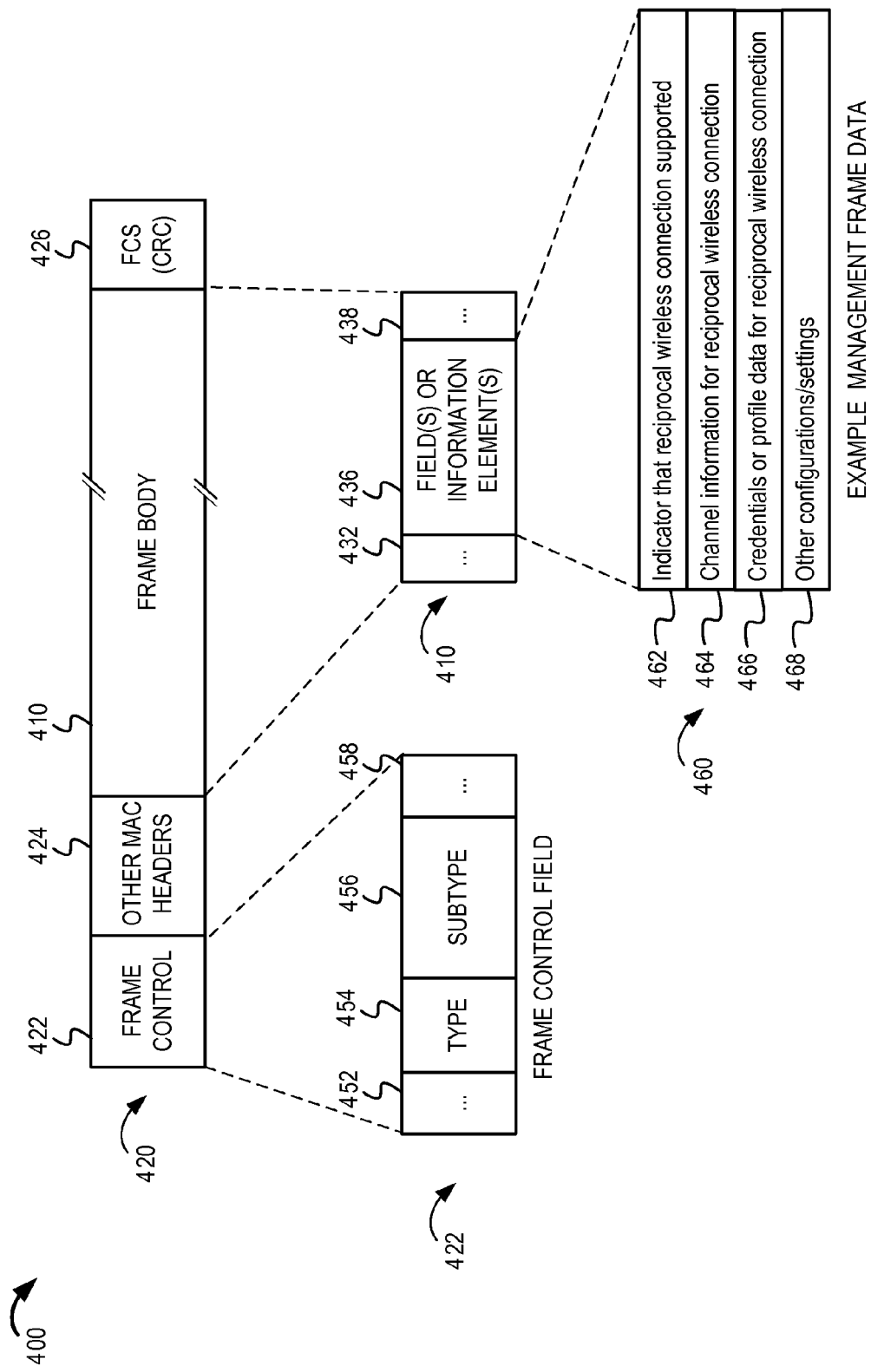
FIG. 4 is a general message format diagram illustrating example extensions to a wireless connection management frame in accordance with various embodiments of the present disclosure.

FIG. 4 depicts a general message format 400 illustrating example extensions to a wireless connection management frame 420 in accordance with various embodiments of the present disclosure. The wireless connection management frame 420 may include a frame control header 422, other media access control (MAC) headers 424 (such as source address, destination address, etc.), a frame body 410, and a frame check sequence 426 (such as a CRC/checksum value). The frame control field 422 may include several miscellaneous headers or other values 452, 458. The frame control field 422 may also include a type field 454 and a subtype field 456. The type field 454 and subtype field 456 may be used to identify the type of management frame. For example, a type value of '00' and subtype '0000' may indicate that the frame is an "Association Request" frame. A type value of '00' and subtype '0001' may indicate that the frame is an "Association Response" frame. In accordance with one embodiment, a specific value combination of type and subtype may be used to indicate management frames for reciprocal wireless connection setup or management messages. Alternatively, existing type and subtypes may be used and the reciprocal wireless connection setup and management messages may be included in the frame body 410 as part of fields or information elements 436.

The frame body 410 may include other miscellaneous fields or headers 432, 438. The protocol for wireless connection management frames may allow for implementation-specific (or proprietary) fields or information elements 436. The information elements 436 may be used to include configurations, settings, or indicators associated with reciprocal wireless connections.

Example management frame data 460 may include zero, one, or more different values. The examples provided in FIG. 4 are non-limiting examples only. Examples of reciprocal connection management settings may include:

An indicator that reciprocal wireless connection is supported by the device sending the indicator (shown as 462).

Channel information for the reciprocal wireless connection (shown as 464) to aid in the discovery of the wireless access point.

Credentials or profile data for the reciprocal wireless connection (shown as 466) to aid in streamlining the authentication or association process used to establish a second wireless connection. In one embodiment, the reciprocal connection management settings may include an identifier (such as a network name or service set identifier (SSID), basic service set identifier (BSSID) of the second wireless access point. Furthermore, the reciprocal connection management settings may include a MAC address, token, or other identifier which may be used to verify the proper wireless interface to use for the reciprocal wireless connection.

Other configurations/settings (shown as 468).

Figure 5:
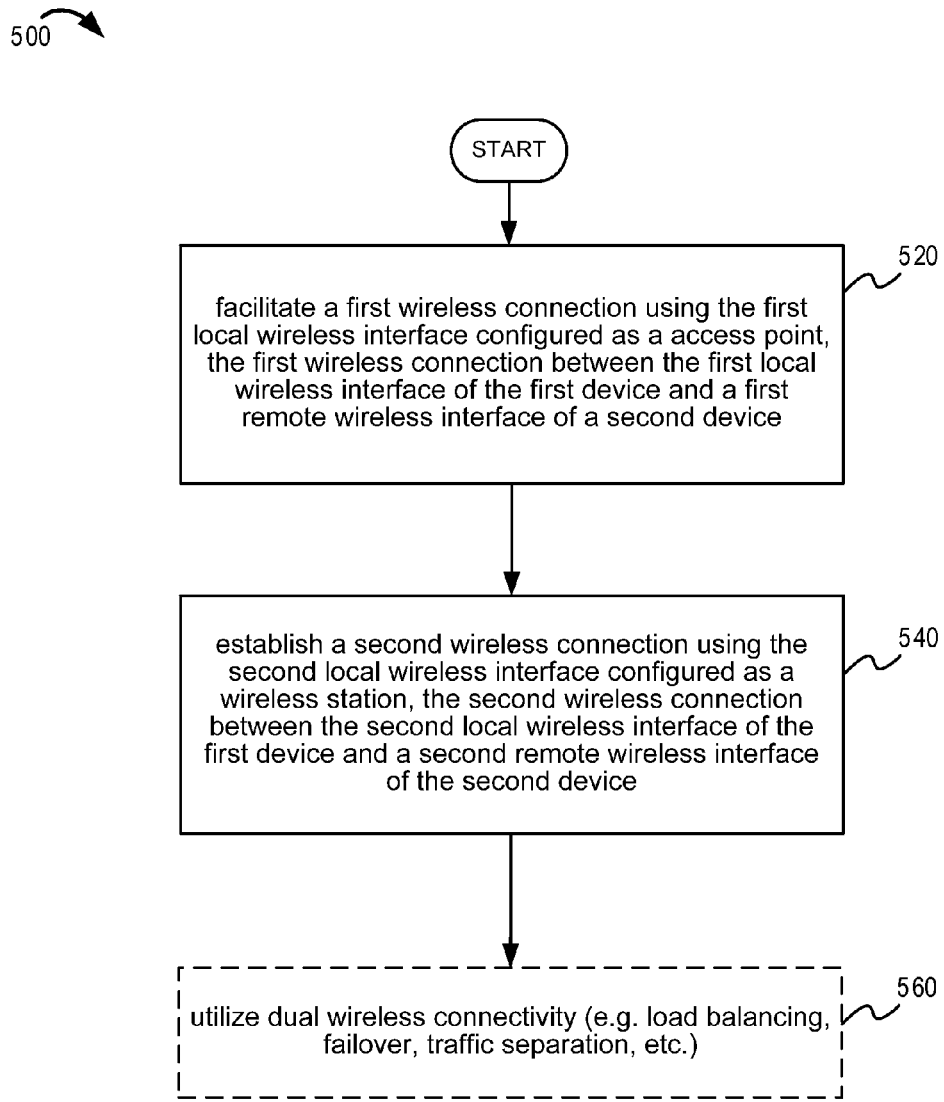
FIG. 5 is a flow diagram illustrating a process for establishing dual wireless connections in accordance with an embodiment of the present disclosure.

FIG. 5 is a flow diagram 500 illustrating a process for establishing dual wireless connections in accordance with an embodiment of the present disclosure.

At 520, a first device may facilitate a first wireless connection using a first local wireless interface configured as a wireless access point. The first wireless connection may include the first local wireless interface of the first device and a first remote wireless interface of a second device.

At 540, the first device may establish a second wireless connection using a second local wireless interface (of the first device) configured as a wireless station. The second wireless connection may include the second local wireless interface of the first device and a second remote wireless interface of the second device.

At optional 560, the first device may utilize dual wireless connectivity (e.g., for load balancing, failover, traffic separation, etc.). In one embodiment, a fast session transfer protocol is altered to support the use of an existing one of the first or second wireless connection upon failure of the other one of the first or second wireless connection.

Figure 6A:
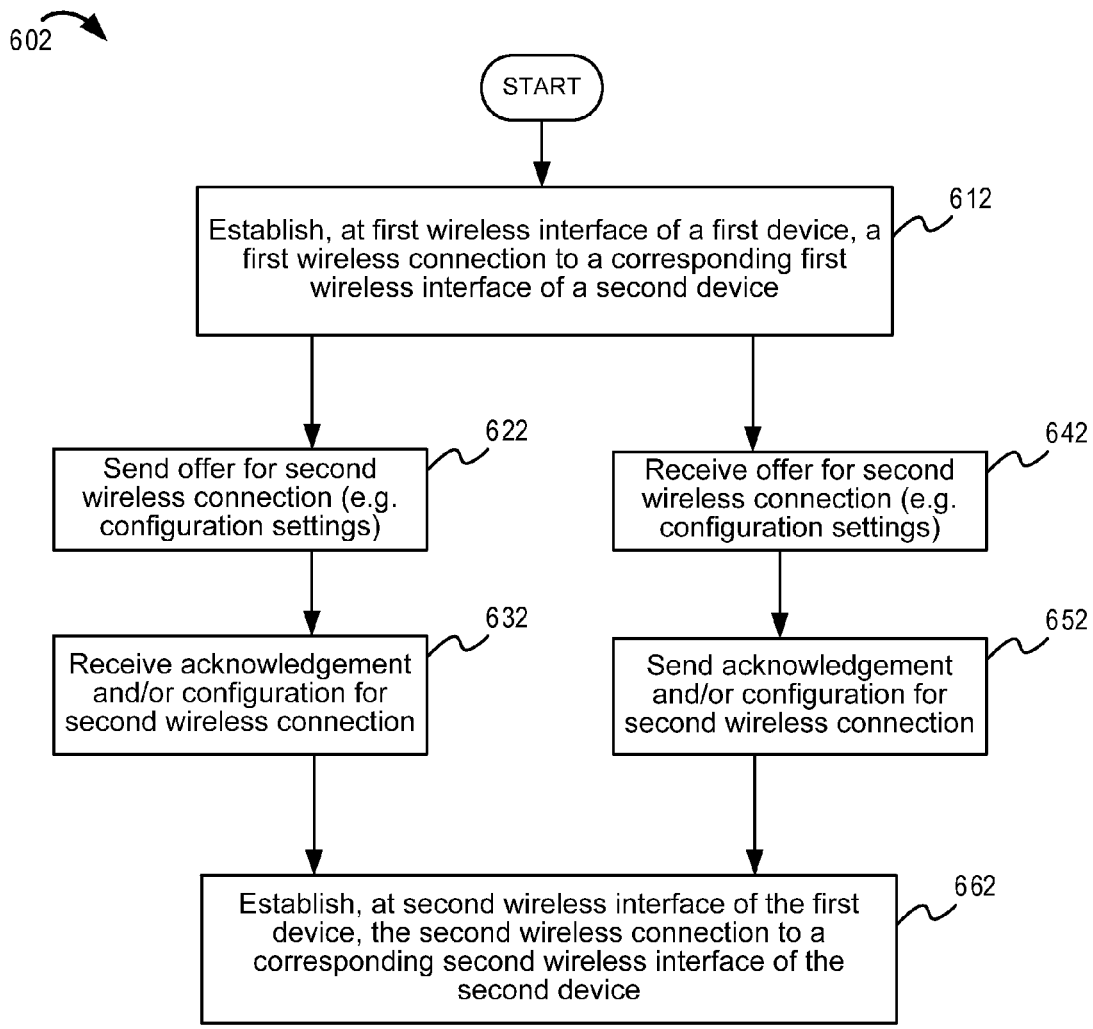
FIGS. 6A and 6B are flow diagrams illustrating example operations associated with establishment of dual wireless connections in accordance with various embodiments of the present disclosure.

FIG. 6A is a flow diagram 602 illustrating example operations associated with establishment of dual wireless connections in accordance with various embodiments of the present disclosure.

At 612, a first device may establish, at first wireless interface of a first device, a first wireless connection to a corresponding first wireless interface of a second device. In an example, the first wireless interface of the first device operates as a wireless access point and accepts an incoming connection from a corresponding first wireless interface of the second device acting as a wireless station. Operations 622, 632 and 642, 652 illustrate alternatives for the devices to coordinate offer/acknowledgement or pre-configuration of the second wireless connection.

In a first example, at 622, the first device may send an offer for the second wireless connection. For example, the first device may indicate that it supports the reciprocal wireless connection. The first device may also send information about its second wireless interface (such as a MAC address or other identifier). At 632, the first device may receive, from the second device, an acknowledgment or configuration settings for the second wireless connection (such as the example configurations configuration/settings described in FIG. 4). For example, the second device may provide an identifier of the second wireless access point configured at the second device to be used for the second wireless connection. The identifier may include an SSID or BSSID. The configurations or settings may be used in the establishment of the second wireless connection at 662.

In a second example, at 642, the first device may receive an offer for the second wireless connection from the second device. For example, the first device may receive an indication that the second device supports the reciprocal wireless connection. The first device may also receive information about the second device's second wireless interface (such as a MAC address or other identifier). At 652, the first device may send to the second device, an acknowledgment or configuration settings for the second wireless connection (such as the example configurations configuration/settings described in FIG. 4). For example, the first device may provide an identifier of the second interface configured as a wireless station at the first device. The identifier may include a MAC address of the second wireless interface of the first device. The configurations or settings may be used in the establishment of the second wireless connection at 662. For example, the second device may be configured to accept incoming connections from the provided MAC address of the first device and to reject other incoming connections with a mismatched MAC address.

At 662, the first device may be configured to establish, at the second wireless interface of the first device, the second wireless connection to a corresponding second wireless interface of the second device.

Figure 6B:
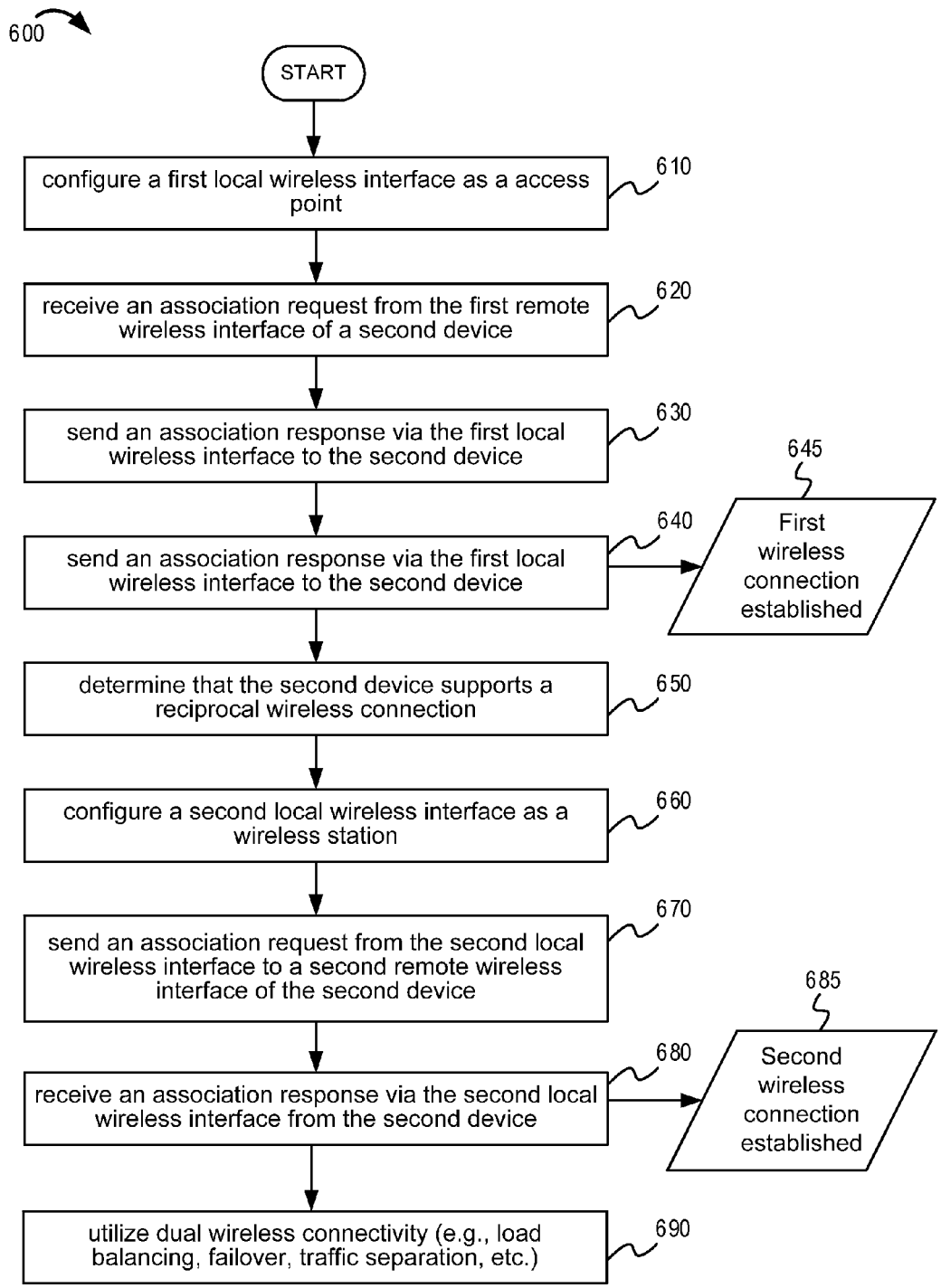

FIG. 6B is a flow diagram 600 illustrating example operations associated with establishment of dual wireless connections in accordance with various embodiments of the present disclosure.

At 610, a first device may configure a first local wireless interface as a wireless access point. At 620, the first device may receive an association request from the first remote wireless interface of a second device. At 630, the first device may send an association response via the first local wireless interface to the second device. At 640, the first device may send an association response via the first local wireless interface to the second device. At 645, the first wireless connection is considered established.

At 650, the first device may determine that the second device supports a reciprocal wireless connection. At 660, the first device may configure a second local wireless interface as a wireless station. At 670, the first device may send an association request from the second local wireless interface to a second remote wireless interface of the second device. At 680, the first device may receive an association response via the second local wireless interface from the second device. At 685, the second wireless connection is considered established.

A 690, the first device may utilize dual wireless connectivity (e.g., load balancing, failover, traffic separation, etc.).

Various operations of FIG. 6A or 6B may be omitted, rearranged, or altered in other embodiments.

Figure 7A:
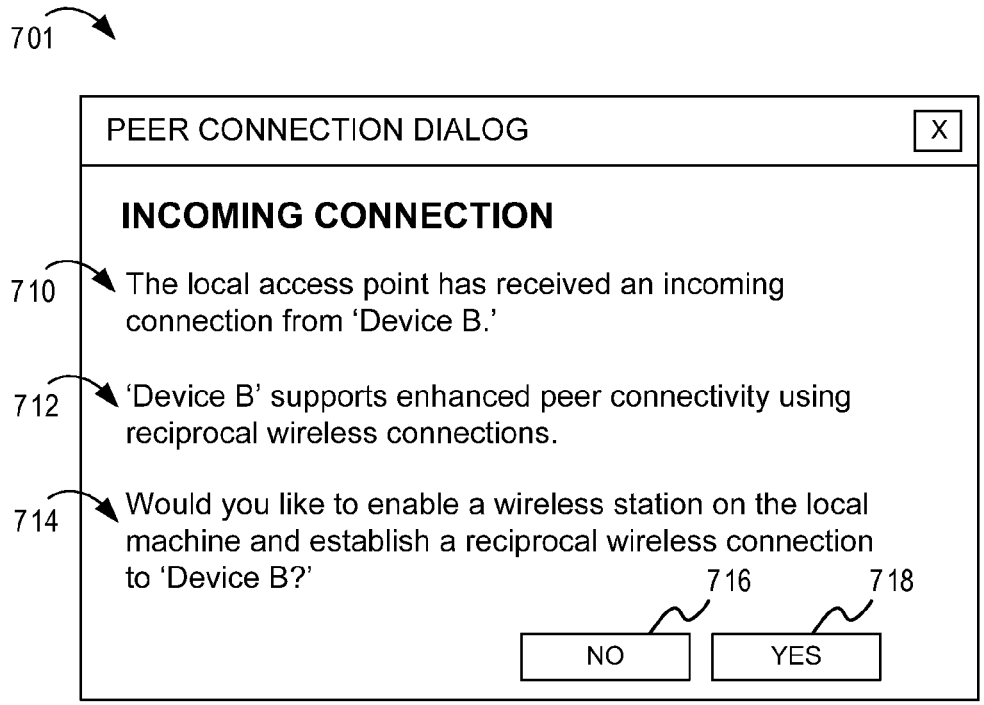
FIGS. 7A and 7B are conceptual illustrations of example user interface elements at a first device and second device, respectively.
Figure 7B:
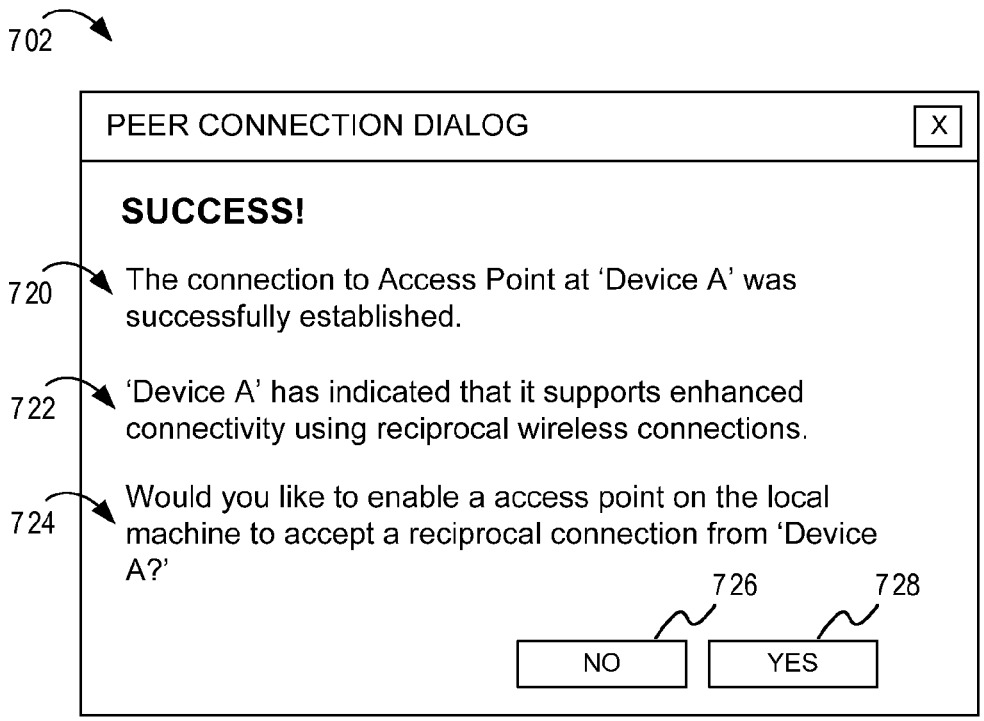

FIGS. 7A and 7B are conceptual illustrations of example user interface elements at a first device and second device, respectively. It should be understood that a variety of different user interface elements may be used to receive user input associated with establishing a reciprocal wireless connection. For example, display, audible, touch, typed, tactile, thermal, or other input elements are readily conceived as alternative user interface components.

In FIG. 7A, a first device has configured a first wireless interface as a local wireless access point to accept incoming connections. A peer connection dialog message 701 may include an indication that the local wireless access point has received an incoming connection from 'Device B' (shown at 710). The peer connection dialog message 701 may also include an indication that the remote machine (Device B') supports enhanced peer connectivity using reciprocal wireless connections (shown at 712). The peer connection dialog message 701 may also include a prompt to ask a user whether to enable a wireless station on the local machine and establish a reciprocal wireless connection to 'Device B.' User interface elements 716, 718 may allow for the first device to receive input from a user. If the first device receives an positive response (e.g., by example user interface 'Yes' element 718) the first device may configure a second local wireless interface as a wireless station and associate with a wireless access point at the second device.

In FIG. 7B (at a second device), a second device has established a first wireless connection to a wireless access point at a first device (Device A'). A peer connection dialog message 702 may include an indication that first wireless connection has been established successfully to the wireless access point at 'Device A' (shown at 720). The peer connection dialog message 702 may also include an indication that the first device (Device A') has indicated that it supports enhanced peer connectivity using reciprocal wireless connections (shown at 722). The peer connection dialog message 702 may also include a prompt to ask a user whether to enable a wireless access point at a second wireless interface of the second device and establish a reciprocal wireless connection to 'Device A.' User interface elements 726, 728 may allow for the first device to receive input from a user. If the second device receives an positive response (e.g., by example user interface 'Yes' element 728) the second device may configure a second wireless interface (of the second device) as a wireless access point and accept an incoming association request from the first device.

It should be understood that FIGS. 1-7B and the operations described herein are examples meant to aid in understanding embodiments and should not be used to limit embodiments or limit scope of the claims. Embodiments may perform additional operations, fewer operations, operations in parallel or in a different order, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system."Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
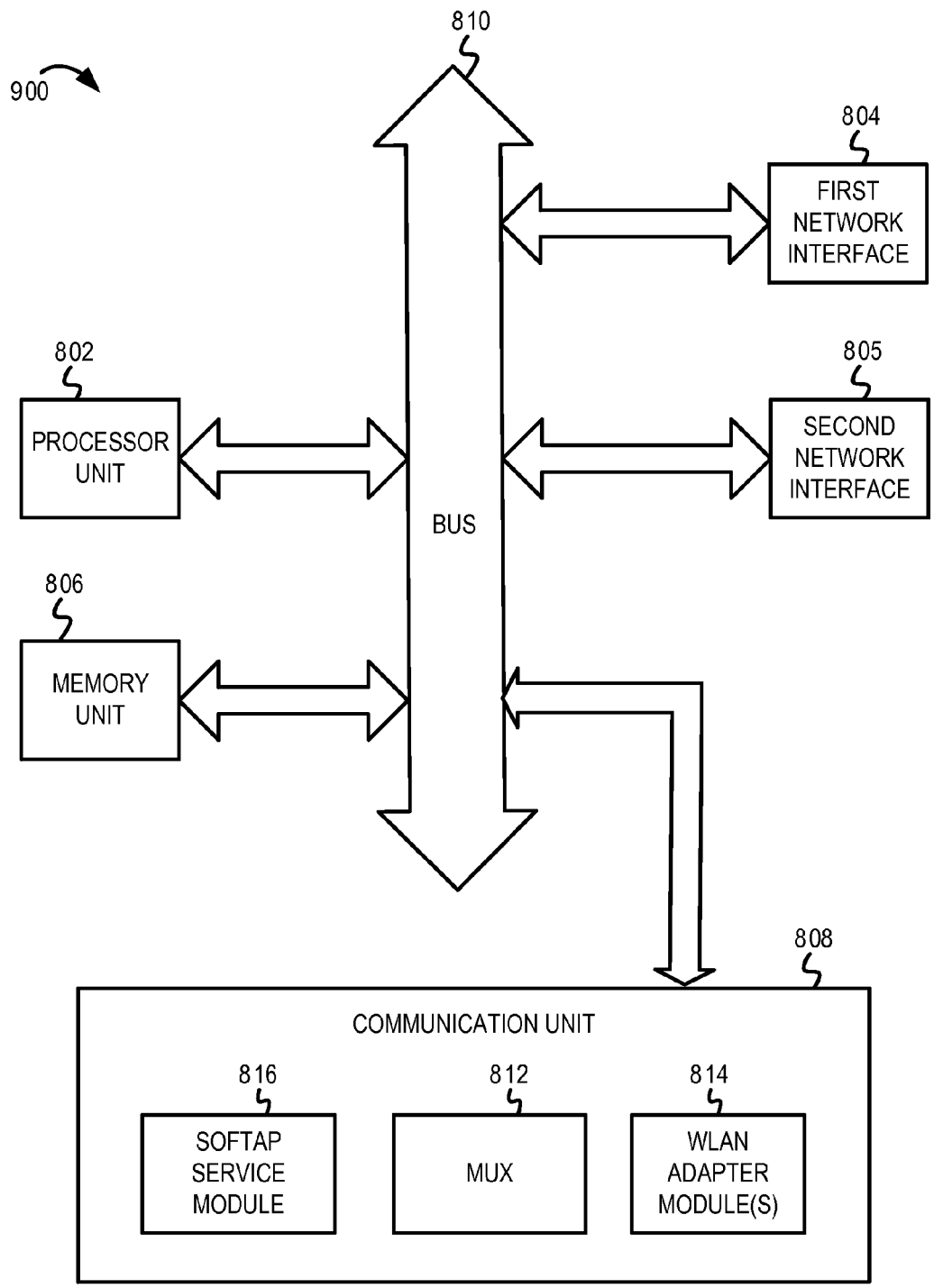
FIG. 8 is an example block diagram of one embodiment of an electronic device including a communication unit for implementing various embodiments of the present disclosure.

FIG. 8 is an example block diagram of one embodiment of an electronic device 800 including a communication unit for establishing peer connectivity using reciprocal wireless connections in accordance with various embodiments of this disclosure. In some implementations, the electronic device 800 may be one of a laptop computer, a netbook, a mobile phone, a powerline communication device, a personal digital assistant (PDA), or other electronic systems. The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, HyperTransport®, Infini-Band®, NuBus, AHB, AXI, etc.), and network interfaces 804, 805 that include at least one of a wireless network interface (e.g., a WLAN interface, a Bluetooth® interface, a WiMAX interface, a ZigBee® interface, a Wireless USB interface, etc.). In one example embodiment the first network interface 804 may comprise a 2.4 GHz or 5 GHz wireless interface capable of utilizing IEEE 802.11a, 802.11b, 802.11g, 802.11n, or 802.11ac protocol. In one example embodiment the second network interface 805 may comprise a 60 GHz wireless interface capable of utilizing IEEE 802.11ad. In some implementations, the electronic device 800 may support more than two wireless network interfaces—each of which is configured to couple the electronic device 800 to a different communication network.

The electronic device 800 also includes a communication unit 808. The communication unit 808 comprises a MUX 812, one or more WLAN adapter module(s) 814 and a SoftAP service module 816. It should be understood, that in some embodiments, the communication unit 808 may also have a dedicated processor (e.g., such as a communication unit comprising a system on a chip, or board with multiple chips, or multiple boards, in which the communication may have one or more dedicated processor or processing unit(s), in addition to the main processor 802). In other embodiments, the first wireless interface 804, second wireless interface 805 and communication unit 808 may together be part of an integrated apparatus or chip for use in a computer system or device. As described above in FIGS. 1-8, the communication unit 808 may implement functionality to establish reciprocal wireless connections. For example, the communication unit 808 may implement functionality described as either first device or second device in the previous descriptions. In some embodiments, the communication unit 808 may be implemented entirely or partially as software executed by an operating system of a computer system. For example, the communication unit 808 may be referred to as a driver (or drivers). Alternative, any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, the memory unit 805, and the network interfaces 804 are coupled to the bus 810. Although illustrated as being coupled to the bus 810, the memory unit 805 may be coupled to the processor unit 802.

While the embodiments are described with reference to various implementations and exploitations, it will be understood that these embodiments are illustrative and that the scope of the inventive subject matter is not limited to them. In general, techniques for establishing reciprocal wireless connections as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for establishing a reciprocal wireless connection between a first device and a second device, the method comprising:
    establishing, at the first device, a first wireless connection between a first local wireless interface of the first device and a first remote wireless interface of the second device;
    determining that the second device supports establishment of the reciprocal wireless connection via a second remote wireless interface of the second device; and
    establishing a second wireless connection between a second local wireless interface of the first device and the second remote wireless interface of the second device in response to determining that the second device supports establishment of the reciprocal wireless connection, wherein,
        the first device is configured as a first wireless access point for the first wireless connection, and
        the first device is further configured as a wireless client of a second wireless access point at the second device for the second wireless connection.

2. The method of claim 1, wherein said establishing the first wireless connection comprises:
    configuring the first local wireless interface as the first wireless access point; and
    accepting an association request from the first remote wireless interface of the second device.

3. The method of claim 2, wherein said configuring the first local wireless interface as the first wireless access point comprises associating a software-based access point service with the first local wireless interface.

4. The method of claim 3, wherein an operating system of the first device is limited to a single software-based access point service.

5. The method of claim 1, wherein said establishing the second wireless connection comprises:
    configuring the second local wireless interface as a wireless station;
    sending an association request from the second local wireless interface to the first wireless access point associated with the second remote wireless interface of the second device; and
    receiving an association response from the second device accepting the association request.

6. The method of claim 1, wherein said establishing the second wireless connection comprises omitting one or more scanning messages or authentication messages otherwise associated with establishing a wireless connection.

7. The method of claim 1, wherein said determining that the second device supports establishment of the reciprocal wireless connection comprises at least one member of the group consisting of:
    receiving a beacon frame from the second remote wireless interface of the second device, the beacon frame including an indication that the second device supports the reciprocal wireless connection;
    receiving an association request from the first remote wireless interface of the second device, the association request including the indication that the second device supports the reciprocal wireless connection; and
    receiving an acknowledgement message from the first remote wireless interface, the acknowledgement message responsive to an offer message from the first device to the second device, the acknowledgement message including the indication that the second device supports the reciprocal wireless connection.

8. The method of claim 1, wherein the second wireless connection comprises a high speed connection that is faster than the first wireless connection.

9. The method of claim 1, wherein said establishing the first wireless connection comprises:
    configuring the first local wireless interface as a wireless station; and
    sending a first association request from the first local wireless interface to the second wireless access point associated with the first remote wireless interface of the second device; and
    receiving a second association response from the second device accepting the first association request.

10. The method of claim 9, wherein said establishing the second wireless connection comprises:
    configuring the second local wireless interface as the first wireless access point; and
    accepting a second association request from the second remote wireless interface of the second device.

11. The method of claim 1, wherein
    the first wireless access point is implemented using a first software-based access point (SoftAP) service at the first device, and the second wireless access point is implemented using a second SoftAP service at the second device.

12. The method of claim 1, further comprising:
utilizing a multiplexing (MUX) component at the first device, the MUX component configured to associate traffic between the first and second wireless connections and the first and second local wireless interfaces, respectively.

13. The method of claim 12, wherein the MUX component is capable of routing the traffic according to a failover policy or a load balancing policy.

14. The method of claim 12, further comprising:
configuring the MUX component to dynamically change an association of the traffic previously associated with the first wireless connection such that the traffic is redirected from the first local wireless interface to the second local wireless interface if the first wireless connection fails.

15. The method of claim 1, wherein the first wireless connection utilizes a first network protocol and the second wireless connection utilizes a second network protocol different from the first network protocol.

16. The method of claim 1, wherein
the first device comprises a first network adapter and a second network adapter,
the first network adapter is configured as the first wireless access point to communicate with the second device using the first local wireless interface,
the first network adapter is a software-based access point service, and
the second network adapter is configured as the wireless client to communicate with the second wireless access point at the second device using the second local wireless interface.

17. The method of claim 1, wherein
the first device can send and receive data over each of the first wireless connection and the second wireless connection.

18. A first device comprising:
a first local wireless interface;
a second local wireless interface; and
a communication unit communicatively coupled with the first local wireless interface and the second local wireless interface, the communication unit configured to:
establish a first wireless connection between the first local wireless interface of the first device and a first remote wireless interface of a second device,
determine that the second device supports establishment of a reciprocal wireless connection via a second remote wireless interface of the second device, and
establish a second wireless connection between the second local wireless interface of the first device and the second remote wireless interface of the second device in response to a determination that the second device supports establishment of the reciprocal wireless connection, wherein,
the first device is configured as a first wireless access point for the first wireless connection, and
the first device is further configured as a wireless client of a second wireless access point at the second device for the second wireless connection.

19. The first device of claim 18, wherein the communication unit configured to establish the first wireless connection includes the communication unit being configured to:
configure the first local wireless interface as the first wireless access point; and
accept an association request from the first remote wireless interface of the second device.

20. The first device of claim 19, wherein the first local wireless interface configured as the first wireless access point includes a software-based access point service being associated with the first local wireless interface.

21. The first device of claim 18, wherein the communication unit configured to establish the second wireless connection includes the communication unit being configured to:
configure the second local wireless interface as a wireless station;
send an association request from the second local wireless interface to the second wireless access point associated with the second remote wireless interface of the second device; and
receive an association response from the second device accepting the association request.

22. The first device of claim 18, wherein the communication unit being configured to determine that the second device supports establishment of the reciprocal wireless connection includes the communication unit being configured to at least one member from the group consisting of:
receive a beacon frame from the second remote wireless interface of the second device, the beacon frame including an indication that the second device supports the reciprocal wireless connection;
receive an association request from the first remote wireless interface of the second device, the association request including the indication that the second device supports the reciprocal wireless connection; and
receive an acknowledgement message from the first remote wireless interface, the acknowledgement message responsive to an offer message from the first device to the second device, the acknowledgement message including the indication that the second device supports the reciprocal wireless connection.

23. The first device of claim 18,
wherein the first wireless connection utilizes a first speed and the second wireless connection utilizes a second speed that is faster than the first speed, and
wherein the first wireless connection utilizes a first network protocol and the second wireless connection utilizes a second network protocol that is different from the first network protocol.

24. The first device of claim 18, wherein the first wireless access point is implemented using a first software-based access point (SoftAP) service at the first device, and the second wireless access point is implemented using a second SoftAP service at the second device.

25. The first device of claim 18, further comprising:
a multiplexing (MUX) component configured to associate traffic between the first and second wireless connections and the first and second local wireless interfaces, respectively.

26. The first device of claim 25, wherein the MUX component is capable of routing the traffic according to a failover policy or a load balancing policy.

27. The first device of claim 25, wherein the MUX component is configured to dynamically change an association of the traffic previously associated with the first wireless connection such that the traffic is redirected from the first local wireless interface to the second local wireless interface if the first wireless connection fails.

28. A non-transitory computer readable medium storing computer program code, the computer program code comprising instructions which when executed by a processor of a first device cause the first device to:

establish a first wireless connection between a first local wireless interface of the first device and a first remote wireless interface of a second device, determine that the second device supports establishment of a reciprocal wireless connection via a second remote wireless interface of the second device, and establish a second wireless connection between a second local wireless interface of the first device and the second remote wireless interface of the second device in response to determining that the second device supports establishment of the reciprocal wireless connection, wherein, the first device is configured as a first wireless access point for the first wireless connection, and the first device is further configured as a wireless client of a second wireless access point at the second device for the second wireless connection.

29. The non-transitory computer readable medium of claim 28, wherein the computer program code further comprises instructions which when executed by the processor of the first device cause the first device to:

configure the first local wireless interface as the first wireless access point; and accept an association request from the first remote wireless interface of the second device.

30. The non-transitory computer readable medium of claim 28, wherein the computer program code further comprises instructions which when executed by the processor of the first device cause the first device to:

configure the second local wireless interface as a wireless station;

send an association request from the second local wireless interface to the second wireless access point associated with the second remote wireless interface of the second device; and receive an association response from the second device accepting the association request.

31. A first device, comprising:
a first local wireless interface;
a second local wireless interface;
a software-based access point (SoftAP) service for providing a wireless access point;
a multiplexing (MUX) component configured to dynamically associate the SoftAP service to one of the first local wireless interface and the second local wireless interface; and
a communication unit communicatively coupled with the first local wireless interface and the second local wireless interface, the communication unit configured to:

establish a first wireless connection between the first local wireless interface of the first device and a first remote wireless interface of a second device, and establish a second wireless connection between the second local wireless interface of the first device and a second remote wireless interface of the second device;

wherein
the MUX component is configured to associate the SoftAP service with the first local wireless interface as a first wireless access point, and
the MUX component is further configured to associate the first device, as a wireless client, with a second wireless access point of the second device.

32. The first device of claim 31, wherein the MUX component is further configured to redirect outbound traffic from the first local wireless interface to the second local wireless interface.

33. The first device of claim 32, wherein the MUX component coordinates with a remote MUX component of the second device such that both the MUX component and the remote MUX component dynamically change configurations for the first and second wireless connection concurrently.

* * * * *